US 8,891,069 B2

(12) United States Patent
Pedersen et al.

(10) Patent No.: US 8,891,069 B2
(45) Date of Patent: Nov. 18, 2014

(54) COHERENT LIDAR SYSTEM BASED ON A SEMICONDUCTOR LASER AND AMPLIFIER

(75) Inventors: Christian Pedersen, Huidoore (DK); Rene Skov Hansen, Nyborg (DK)

(73) Assignee: Windar Photonics A/S, Taastrup (DK)

( * ) Notice: Subject to any disclaimer, the term of this patent is extended or adjusted under 35 U.S.C. 154(b) by 850 days.

(21) Appl. No.: 12/679,685

(22) PCT Filed: Oct. 8, 2008

(86) PCT No.: PCT/DK2008/000350
§ 371 (c)(1),
(2), (4) Date: Jun. 22, 2010

(87) PCT Pub. No.: WO2009/046717
PCT Pub. Date: Apr. 16, 2009

(65) Prior Publication Data
US 2010/0277714 A1 Nov. 4, 2010

(30) Foreign Application Priority Data

Oct. 9, 2007 (DK) ................................. 2007 01457
May 26, 2008 (DK) ................................. 2008 00721

(51) Int. Cl.
*G01S 17/95* (2006.01)
*G01S 17/58* (2006.01)
*G01S 7/497* (2006.01)
*G01S 7/481* (2006.01)

(52) U.S. Cl.
CPC ................. *G01S 17/95* (2013.01); *G01S 17/58* (2013.01); *G01S 7/497* (2013.01); *G01S 7/4811* (2013.01); *G01S 7/4818* (2013.01)
USPC ......................................................... 356/28

(58) Field of Classification Search
CPC ............... G01C 3/00; G01C 3/08; G01P 3/36
USPC ............. 356/3.01–3.15, 4.01–4.1, 5.01–5.15, 356/6–22, 28, 28.5
See application file for complete search history.

(56) References Cited

U.S. PATENT DOCUMENTS

| 4,995,720 A | 2/1991 | Amzajerdian |
| 5,164,784 A | 11/1992 | Waggoner |

(Continued)

FOREIGN PATENT DOCUMENTS

| JP | 3-252586 | 11/1991 |
| JP | H5-67845 A | 3/1993 |

(Continued)

OTHER PUBLICATIONS

Michael Harris, "Continuous-wave bistatic laser Doppler wind sensor" Applied Optics Volumn 40 No. 9 pp. 1501-1506.*

(Continued)

*Primary Examiner* — Luke Ratcliffe
(74) *Attorney, Agent, or Firm* — Volentine & Whitt, PLLC (57) ABSTRACT

The present invention relates to a compact, reliable and low-cost coherent LIDAR (Light Detection And Ranging) system for remote wind-speed determination, determination of particle concentration, and/or temperature based on an all semiconductor light source and related methods. The present invention provides a coherent LIDAR system comprising a semiconductor laser for emission of a measurement beam of electromagnetic radiation directed towards a measurement volume for illumination of particles in the measurement volume, a reference beam generator for generation of a reference beam, a detector for generation of a detector signal by mixing of the reference beam with light emitted from the particles in the measurement volume illuminated by the measurement beam, and a signal processor for generating a velocity signal corresponding to the velocity of the particles based on the detector signal.

36 Claims, 10 Drawing Sheets

(56) References Cited

U.S. PATENT DOCUMENTS

| | | | |
|---|---|---|---|
| 5,170,218 | A | 12/1992 | Keene |
| 5,175,643 | A | 12/1992 | Andrews |
| 5,657,339 | A | 8/1997 | Fukunaga |
| 5,689,363 | A | 11/1997 | Dane et al. |
| 6,285,288 | B1 * | 9/2001 | Langdon et al. ............ 340/603 |
| 7,027,475 | B1 | 4/2006 | Zediker et al. |
| 7,471,710 | B2 * | 12/2008 | Cliche et al. ............ 372/38.08 |
| 2007/0075546 | A1 | 4/2007 | Avagliano et al. |

FOREIGN PATENT DOCUMENTS

| | | |
|---|---|---|
| JP | 5-87823 | 4/1993 |
| JP | H5-218594 A | 8/1993 |
| JP | 08-167758 | 6/1996 |
| JP | H8-181383 A | 7/1996 |
| JP | 11-064358 | 3/1999 |
| JP | 2005-276904 A | 10/2005 |
| WO | 9410729 | 5/1994 |
| WO | 0106473 | 1/2001 |
| WO | 2004/012994 A2 | 2/2004 |
| WO | 2004012994 | 2/2004 |

OTHER PUBLICATIONS

Michael Harris et al.; "Continuous-Wave Bistatic Laser Doppler Wind Sensor"; Applied Optics; Mar. 20, 2001; vol. 40, No. 9, pp. 1501-1506.

C. M. Sonnenschein et al.; "Signal-to-Noise Relationships for Coaxial Systems That Heterodyne Backscatter From the Atmosphere", Applied Optics; Jul. 1971; vol. 10, No. 7, pp. 1600-1604.

Michael Harris et al., "Single-Particle Laser Doppler Anemometry at 1.55 um"; Applied Optics; Feb. 20, 2001; vol. 40, No. 6; pp. 969-973.

Robert T. Menzies et al.; "Coherent Doppler Lidar for Measurements of Wind Fields"; Proceedings of the IEEE; Mar. 1989; vol. 77, No. 3; pp. 449-461.

Japanese Office Action dated Nov. 6, 2012.

Harris M et al., "Continuous-Wave Bistatic Laser Doppler Wind Sensor", Applied Optics, OSA, Optical Society of America, Washington, DC, vol. 40, No. 9, Mar. 20, 2001, pp. 1501-1506.

Christer J. Karlsson et al., "All-fiber multifunction continuous-wave coherent laser radar at 1.55μm for range, speed, vibration and wind measurements", Applied Optics, vol. 39, No. 21, Jul. 20, 2000, pp. 3716-3726.

M. Harris et al., "The role of laser coherence length in continuous-wave coherent laser radar", Journal of Modern Optics, 1998, vol. 45, No. 8, pp. 1567-1581.

Michael Harris et al., "Continuous—wave bistatic laser Doppler wind sensor", Applied Optics, Mar. 20, 2001, vol. 40, No. 9, pp. 1501-1506.

David C. Dowell et al., "Centrifuging of Hydrometeors and Debris in Tornadoes: Radar-Reflectivity Patterns and Wind-Measurements Errors", American Meteorological Society, vol. 133, Jun. 2005, pp. 1501-1524.

Chinese Office Action dated Apr. 25, 2012.

Translation of Chinese Office Action, Apr. 25, 2012.

* cited by examiner

COHERENT LIDAR SYSTEM BASED ON A SEMICONDUCTOR LASER AND AMPLIFIER

CROSS REFERENCE TO RELATED APPLICATIONS

This application is the national phase under 35 U.S.C. 371 of PCT International Application No. PCT/DK2008/000350 which has an international filing date of Oct. 8, 2008, and also claims priority under 35 U.S.C. 119 to Danish application PA 2007 01457 filed on Oct. 9, 2007, and to Danish application PA 2008 00721 filed on May 26, 2008, which applications are hereby incorporated by reference in their entirety for all purposes as if fully set forth herein.

The present invention relates to a compact, reliable and low-cost coherent LIDAR (Light Detection And Ranging) system for remote wind-speed determination, determination of particle concentration, and/or temperature based on an all semiconductor light source and related methods.

A coherent LIDAR system is an attractive system for determination of the line of sight wind speed at remote locations. The basic principle relates to the Doppler shift that back scattered light from aerosols generates when irradiated by coherent laser light. Under the assumption that the aerosol movements resemble the air-flow closely, the measured Doppler frequency can be used for calculating of a hereto proportional wind speed.

Not only aerosols, such as water droplets, dust, etc., can provide the Doppler shifted back scattered signal, but also single-particles.

A continuous wave (CW) coherent LIDAR rely on the focusing properties of the laser to confine the actual probe volume. The width of the probe volume is confined by the diameter of the laser beam in the focused region (i.e. the confocal region). The length of the probe volume along the beam axis is confined approximately by the Rayleigh length of the focused laser beam. For a CW LIDAR focused at a distance of one hundred meters from the CW LIDAR system, the width of the probe volume is typically in the order of one centimetric and the length of the probe volume is in the order of ten meters depending on wavelength and focusing optics (the telescope). For pulsed systems the width of the probe volume is the same as for the CW LIDAR case, but the length of the probe volume is given by the spatial length of the emitted pulse.

The basic principles of the coherent LIDAR dates more than 35 years back, c.f. "Signal-to-Noise Relationships for Coaxial Systems that Heterodyne Backscatter from the Atmosphere", Applied Optics, Vol. 10, No. 7, July 1971, C. M. Sonnenschein and F. A. Horrigan. The applications have traditionally been of scientific interest, for instance within atmosphere physics. However, nowadays the LIDAR has become more and more relevant for practical industrial applications. One such example is for the control of wind turbines. The need for higher efficiency has forced the wind turbine industry to continuously increase the wing span over the last decades in order to improve the performance in terms of extracted electrical energy per installed wind turbine. However an increased wing span leads to a substantial mechanical load imposed by strong winds and by wind turbulence in particular. A compact, rugged and cheap coherent LIDAR device for wind speed prediction tens of meters up-wind will allow for optimisation and protection of the wind turbine. The time delay between the actual wind speed measurement and the time where the wind actual reached the wind turbine can be used to protect the load of the wings, for instance by changing the pitch of the wing. Another example is vortex detection generated by landing air crafts. The landing (or take off) frequency of aircrafts is primarily determined by a safety margin so as to insure no hazard from vortexes generated by the previous aircraft. Using a coherent LIDAR for vortex surveillance allows this safety period to minimised, thus increasing the traffic intensity and thereby the capacity of the airport.

Prohibitive factors for wide spread use of LIDAR are cost, power consumption, size, and ruggedness. Today's commercially available LIDAR systems cost roughly 200 K USD, a price level that exclude many applications to be exploited. The use of LIDAR systems at remote places, such as off-shore wind turbine parks requires operation with little or no maintenance for long periods of time as well as lower power consumption.

"Single-Particle laser Doppler anemometry at 1.55 μm", Applied Optics, Vol. 40, No. 6, by Michael Harris, Guy N. Pearson et. al. discloses a CW LIDAR system for wind speed measurements. The line-of-sight component of velocity is determined by measurement of the frequency shift of light scattered from small particles in the atmosphere that are assumed to be swept along at same speed as the wind. The frequency shift is conveniently measured by heterodyne detection in which the received backscattered light is mixed with a reference local-oscillator beam. The wind velocity is then inferred from the resulting beat frequency. The laser comprises a semiconductor laser source operating at a wavelength of 1.55 μm that is amplified to about 1 Watt by an Erbium-doped fibre power amplifier in a master oscillator power amplifier (MOPA) configuration. The master oscillator is an extended cavity In/P laser, and its line width was measured to be about 20 KHz by the delayed self-heterodyne method.

Also a commercial CW coherent LIDAR product exists on the market [Quinetic]. This system uses a diode pumped fibre ring oscillator followed by a diode pumped Er-doped fibre amplifier to obtain a suitable beam at 1.55 μm.

Although the term heterodyne detection is often used in connection with optical interferometry, the term homodyne detection is used throughout the present disclosure to signify that the reference beam (the local oscillator) is derived from the same source as the signal beam before the modulating process, i.e. the scattering by the target.

Thus, there is a need for inexpensive and rugged coherent LIDAR systems opening new industrial applications as discussed above.

The most expensive and complicated component in a coherent LIDAR system today is the laser assembly. Due to an extremely low back scatter coefficient of the aerosols ($\sim 10^{-12}$) a refined detection scheme is required that relies heavily on high quality, high power, coherent light sources. The CW output power from the laser assembly should be in the order of 1 Watt in order to obtain sufficient back scattered light to be detected. The homodyne detection technique requires firstly that the coherence length of the light source to be essentially two times the distance to probe volume, e.g. 200 meters for typical wind turbine applications. This corresponds to a full width half minimum (FWHM) of the laser spectrum of only a few 100 kHz relative to a centre frequency of about 200 THz. Secondly, the spatial coherence of the laser beam should be close to that of an ideal Gaussian beam, so as to insure the generation of a maximum beat signal from the quadratic detector. The beat signal relates to the frequency difference between the reference signal and the back scattered—and Doppler shifted-signal. Finally, the relative intensity noise (RIN) of the laser should be lower than the beat signal at the detector. All these qualities are usually only found in expensive, bulky $CO_2$ lasers as e.g. disclosed in "Coherent Doppler Lidar for Measurements of Wind Fields", Proceedings of the IEEE, Vol. 77, No. 3, MARCH 1989, Robert T. Menzies and R. Michael Hardety, or, in Master Oscillators followed by a Power Amplifier (MOPA).

Typically, the master oscillator is a fibre laser or diode laser in an external cavity set-up, and the power amplifier is an Er:doped fibre pumped with a high power diode pump module. The MOPA system is complicated using expensive, bulky, disintegrated optics.

Thus, there is a need for a coherent LIDAR system that can be based on an inexpensive, rugged, integrated semiconductor laser assembly.

According to a first aspect of the present invention, the above-mentioned and other objects are fulfilled by a method for velocity determination based on light scattered by a target, comprising the steps of emitting a measurement beam of electromagnetic radiation and directing the beam towards a measurement volume for illumination of a target in the measurement volume, generating a reference beam, mixing the reference beam with light emitted from the target in the measurement volume illuminated by the measurement beam for generation of a velocity signal corresponding to the velocity of the target, wherein the step of emitting a measurement beam comprises provision of a semiconductor laser for the emission of the measurement beam.

According to a second aspect of the present invention, the above-mentioned and other objects are fulfilled by a coherent LIDAR system comprising a semiconductor laser for emission of a measurement beam of electromagnetic radiation directed towards a measurement volume for illumination of a target, such as particles, in the measurement volume, a reference beam generator for generation of a reference beam, and a detector for generation of a detector signal by mixing of the reference beam with light emitted from the target in the measurement volume illuminated by the measurement beam.

Preferably, the coherent LIDAR system comprises a signal processor, e.g. a signal processor for generating a velocity signal corresponding to the velocity of the target based on the detector signal.

The target may be any object capable of interacting with light incident upon it resulting in emission of light from the target. The target in the measurement volume may for example be aerosols, such as water droplets, dust, etc., particles, molecules, atoms, a surface of an object larger than the width of the measurement volume, etc.

Throughout the present disclosure, the term "particles" includes aerosols, molecules, atoms, etc.

The signal processor may be configured for determination of temperature in the measurement volume. For example, the signal processor may be configured for generating a temperature signal corresponding to the temperature in the measurement volume based on the detector signal.

The signal processor may instead of, or in combination with, generating a velocity signal corresponding to the velocity of the target based on the detector signal be configured for generating a concentration signal corresponding to the concentration of the particles in the measurement volume based on the detector signal.

In an embodiment of the present invention, the signal processor may be configured for determination of particle concentration in the measurement volume.

Measurement of the doppler shift of the back scattered signal from the measurement volume are used for determination of the velocity of the particles. The amplitude of the backscattered doppler shifted signal may be used for determination of the concentration of particles in the measurement volume. Accordingly, the present invention may be used for measurements of particle, e.g. dust, concentration. The system, e.g. the signal processor, may be configured to send a status signal indicating status, e.g. alarm, high level, medium level, low level, etc.

In absence of a particle flow, i.e. the velocity is zero or very low, the doppler shifted signal will be zero and the amplitude will be difficult to extract due to other DC signals coming from the detection process. One way to overcome this may be to include a frequency shifting element, e.g. an acousto-optic modulator, in the system for frequency shifting the measurement beam and/or the reference beam. Thereby a frequency bias may be added to the received signals corresponding to the frequency shift induced by the frequency shifting element. In the special case of low or no particle flow, the amplitude of the zero doppler shifted signal will now be displayed as the amplitude of the frequency component given by the frequency shifting element.

According to a third aspect of the present invention, the above-mentioned and other objects are fulfilled by a method for determination of particle concentration based on light scattered by particles, comprising the steps of emitting a measurement beam of electromagnetic radiation and directing the beam towards a measurement volume for illumination of particles in the measurement volume, generating a reference beam, mixing the reference beam with light emitted from the particles in the measurement volume illuminated by the measurement beam for generation of a concentration signal corresponding to the concentration of the particles, wherein the step of emitting a measurement beam comprises provision of a semiconductor laser for the emission of the measurement beam.

The detector signal output by the detector contains the difference frequency of the reference beam and light emitted from the target corresponding to the Doppler shift generated by movement of the target in the measurement volume. Thus, the peak of the power spectrum of the detector signal provides information of the mean velocity of the target along the direction of line of sight of the LIDAR system while the width (FWHM) of the spectral distribution provides information about the velocity distribution. In case of wind speed measurements, e.g. based on aerosols suspended in the air and following wind movements, turbulence information can thereby be extracted.

In case the medium residing in the measurement volume is a gas, Raleigh scattering can be probed. Raleigh scattering originates from the elastic interaction between the excitation light beam and the molecules of the gas. In that case the width of the Doppler spectrum corresponds to the temperature of the gas. Therefore, temperatures of gasses can be measured at long distances. It should be noted that compared to back scattered signals from aerosols, Raleigh scattered signals are usually orders of magnitude smaller and depends strongly on the specific gas component and the excitation wavelength (Raleigh scattering is a function of wavelength to the power of minus 4). Special gas components of interest could be oxygen, nitrogen, carbon dioxide and NOx gasses.

The semiconductor laser may be a vertical external cavity surface-emitting laser (VECSEL) for emission of a high power beam. In a VECSEL, electromagnetic radiation is emitted perpendicular to the junction and the surface of the diode chip. The semiconductor chip or device, also denoted the gain chip, may contain a single semiconductor Bragg mirror and the active region (gain region) with typically several quantum wells (QWs). The device may have a total thickness of only a few micrometers. The laser resonator is completed with an external mirror.

The large transverse area of a VECSEL facilitates fundamental mode operation and leads to a high beam quality. The transverse diameter of the beam is in the order of 400 micron. Further, the output beam may be circular symmetrical with an insignificant amount of astigmatism leading to simple imaging properties.

The laser material in the electromagnetic cavity may be pumped optically. Optical pumping facilitates uniform pumping of large active areas. The optical pump source may for example be a high-brightness edge emitting broad-area diode or a diode laser bar. It is possible to achieve tens of watts of output power when pumping with a diode bar. Utilisation of an external resonator may facilitate provision of a diffraction-limited output.

In an embodiment of the invention, the semiconductor laser is a tapered semiconductor laser. Due to its tapered structure, the tapered semiconductor laser provides a high output power at its large area output facet, e.g. having a width of app. 250 µm, with a high beam quality since the ridge-waveguide at the narrow end, e.g. having a width of app. 3 µm, of the tapered laser forms a single mode spatial filter.

The coherent LIDAR system may further comprise a semiconductor tapered power amplifier for amplification of the beam emitted by the semiconductor laser, for example the semiconductor laser and amplifier are of the semiconductor MOPA type.

In accordance with the present invention, a low cost, compact, rugged coherent LIDAR system with low power consumption has been realized using an all semiconductor laser assembly, for example based on tapered diode laser geometries.

In one embodiment of the invention, a MOPA assembly with a semiconductor master oscillator followed by a semiconductor tapered power amplifier, both realized on the same substrate constitute a cheap, rugged solution, ideal for low power industrial applications.

In one embodiment of the invention, an output power of approximately 1 Watt has been provided by a tapered semiconductor assembly, even at a wavelength of 1.5 µm where the electron to photon conversion is less efficient as compared to 800 nm range. A wavelength of 1.5 µm or more is important for practical LIDAR use, since 1.5 µm is within the eye-safe region of the optical spectrum. The laser safety requirements during operation are more easily met when operated at eye-safe wavelengths.

Further, the temporal coherency of tapered semiconductor laser assemblies, i.e. the coherence length, is sufficient for coherent LIDAR applications. This delicate feature is essential to the homodyne detection technique used for extracting the Doppler shifted backscattered signal.

Still further, even though the spatial coherence of the tapered semiconductor devices is not perfect when compared to a diffraction limited Gaussian beam, the laser assembly radiation is of sufficient quality to be used in a LIDAR system. Spatial filtering in the reference beam can remove or reduce the non-Gaussian spatial components of the reference beam that otherwise may lead to a reduced signal to noise ration of the detector signal. In one embodiment, the spatial filtering is performed in the Fourier plane, where the Gaussian part is easily isolated, spatially.

In one embodiment of the invention, a feed-back signal to the laser assembly is provided directly from the detector when operating the LIDAR system. When the laser assembly is not operating in a single-frequency state, the coherence length will change dramatically. As a result the LIDAR Doppler signal will drop out. By tuning for instance the temperature or current of the laser assembly, single-frequency operation can be re-established and also optimised, by maximizing the measured Doppler signal. It should be noted that the coherence length of the laser assembly is very sensible to even small changes in settings. In a different embodiment, the noise signal from the detector is utilized for detecting the laser performance. It is observed that the laser assembly noise increases significantly when the LIDAR signal decreases. It is believed that the decrease of the LIDAR signal is caused by multimode mode operation of the laser assembly. By fine tuning of the laser parameters, e.g. current or temperature, the LIDAR signal can be increased or re-optimised. Also the DC detector signal can be applied for control purposes, since changes from the preferred single frequency state to multimode operation is followed by a change in the DC power level of the laser assembly. Thus, by detecting the DC signal from the detector a control signal can be extracted. In yet another embodiment, the laser assembly is actively or passively locked to an external cavity for stabilisation of the laser frequency.

Many different coherent LIDAR systems can be realized in accordance with the present invention, for example a coherent bistatic LIDAR.

The above and other features and advantages of the present invention will become readily apparent to those skilled in the art by the following detailed description of exemplary embodiments thereof with reference to the attached drawings, in which.

The figures are schematic and simplified for clarity, and they merely show details which are essential to the understanding of the invention, while other details have been left out. Throughout, the same reference numerals are used for identical or corresponding parts.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the concept of the invention to those skilled in the art.

Figure 1:
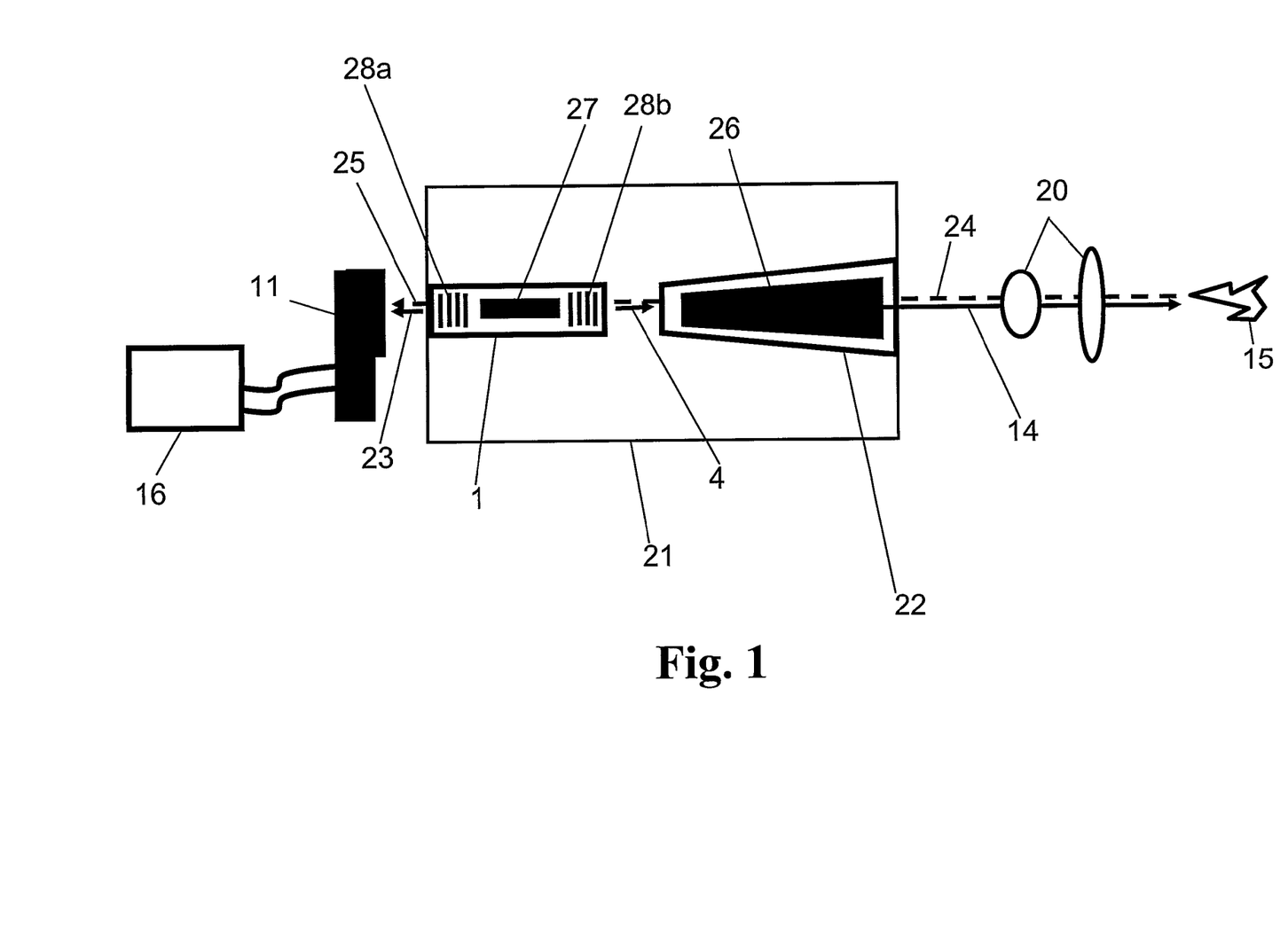
FIG. 1 schematically illustrates one embodiment of the invention.

FIG. 1 schematically illustrates one preferred embodiment of the coherent LIDAR according to the invention. A semiconductor laser 1 emits a first coherent light beam 4 of high spatial and spectral beam quality. The semiconductor laser is pumped by current supplied by electrode 27.

The good spatial quality, i.e. a Gaussian beam profile, is obtained by keeping the transverse dimensions of the semiconductor laser cavity 1 small, typically in the order of 1 by 5 microns. If the transverse dimensions of the cavity increase, in order to increase the output power of the beam 4, the beam 4 will eventually become multi-moded, thus of less good spatial quality, an essential property for coherent LIDARs. If the current applied to the electrode 27 is continuously increased the resulting increase in intensity in the laser 1 will tend to destroy the laser. Therefore a single transverse mode diode laser is typically limited to an output power of 200 mW. To increase the output power further, a semiconductor tapered power amplifier 22 is added. The current to this device is supplied through the electrode 26. By designing the tapered gain structure to fit the divergence angle of the output beam 4, the output beam 4 can be amplified significantly while substantially maintaining the beam quality of the laser 1. Typically, the measurement beam 14 is 1.3-2 times a diffraction limited Gaussian beam. Since the transverse dimensions of the amplifier expands as the laser beam 4 propagates through the tapered amplifier, the light intensity can be kept at a safe level since the intensity is kept low. Whereas the transverse dimensions of the wave guide is constant (1 by 5 microns), the tapered amplifier at the output facet has a 1 by 200 micron wide output aperture. After amplification the output power of the beam 4 from the laser is in the order of 1 Watt, which is adequate for coherent LIDAR applications.

By further incorporating a frequency selective element, 28a and 28b into the semiconductor laser structure of laser 1 of the illustrated embodiment, the number of oscillating longitudinal laser modes can be reduced to only one. The frequency elements can be distributed gratings, as shown in FIG. 1, but also e.g. etalons. The line-width (FWHM spectrum) of the laser 1 can thereby be reduced dramatically from approximately 1000 GHz to approximately 100 kHz corresponding to a coherence length of the order of 1 km. This coherence length is well-suited to the coherent LIDAR application. In the embodiment shown in FIG. 1, the gratings 28a and 28b also serves as mirrors for the laser 1. By designing the grating 28a appropriately also a reference beam 23 can be generated. This beam 23 is directed towards a detector 11. Thus, in the illustrated embodiment, the laser 1 also generates the reference beam 23

Throughout the present disclosure, the illustrated light source is denoted a semiconductor MOPA. The semiconductor laser 1 constitutes the Master Oscillator (MO) and the tapered semiconductor amplifier 22 constitutes the Power Amplifier (PA). Both the laser 1 as well as the tapered amplifier 22 can be mounted on the same substrate 21 to form an integrated laser assembly. The mounted laser assembly including the substrate mount is in the order of 4×6×8 mm. The laser assembly can be produced using large scaled semiconductor wafer technology.

The measurement beam 14 is focused at the measurement volume 15 using the imaging optics 20. The imaging optics 20 could be a Galliæo or Keplian telescope. When the (moving) targets in the measurement volume 15 are illuminated by the measurement beam 14, the targets will irradiate a small amount of light 24 towards the coherent LIDAR detector 11. If the targets are aerosols, the back reflected or scattered light is in the order of 1 pW when illuminated by a measurement beam 14 of 1 W.

The back reflected light 24 is now propagating through the imaging optics 20, the tapered amplifier 22 and the laser 1. Since the laser 1 is a wave guide only supporting a single transverse spatial mode the back reflected beam is now spatially filtered. The spatially filtered beam 25 is now mixed with the reference beam 23 by the optical detector 11 to form a measurement signal. Note that the back reflected beam is also amplified during passage of the amplifier 22 and laser 1. The measurement signal contains spectral components corresponding to the difference frequency between the measurement beam 14 and the back reflected beam 24. The difference frequency corresponds to Doppler frequency of the moving targets in measurement volume 15 relatively to coherent LIDAR. By processing the measurement signal using a signal processor the corresponding speed of the targets can be calculated.

In the illustrated embodiment, two spatially filtered beams 23 and 24 are mixed at the detector. Hereby other spatial components of the beams generated by the laser assembly that is not fully diffraction limited is reduced or removed by spatial filtering so that unwanted interference and noise in the detector signal is reduced whereby the signal to noise ratio of the detector signal is improved.

Figure 2:
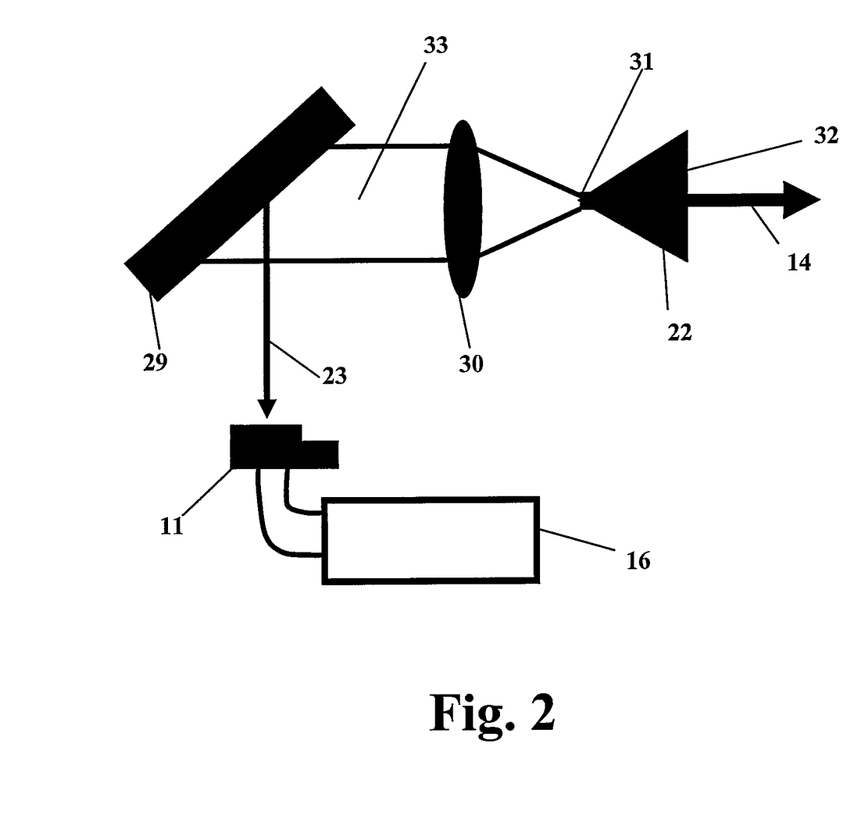
FIG. 2 schematically illustrates a semiconductor external cavity diode laser.

FIG. 2 schematically illustrates an embodiment of the invention with a semiconductor laser light source operating in an autodyne configuration wherein the backscattered light from the target in the measurement volume 15 is transmitted back into the semiconductor laser and therefore perturbs the power output of the semiconductor laser that can be monitored at the rear end of the laser. Thus, in the illustrated embodiment, a tapered semiconductor laser 22 co-operates with an external cavity formed between a diffractive optical element 29, such as a holographic optical element 29, that is configured to reflect a small part of the light 23 towards the detector 11 for monitoring of the above-mentioned perturbations, and reflect the remaining part 33 of the light back towards the other reflector of the external cavity constituted by the coated output facet 32 of the tapered laser 22. Due to its tapered structure, the tapered semiconductor laser 22 provides a high output power at its large area output facet, e.g. having a width of app. 250 µm, with a high beam quality since the ridge-waveguide at the narrow end 31, e.g. having a width of app. 3 µm, of the tapered laser 22 forms a single mode spatial filter. Lens 30 collimates the light 33. The signal processor is adapted to extract the Doppler frequency from the monitoring signal 23.

Figure 3:
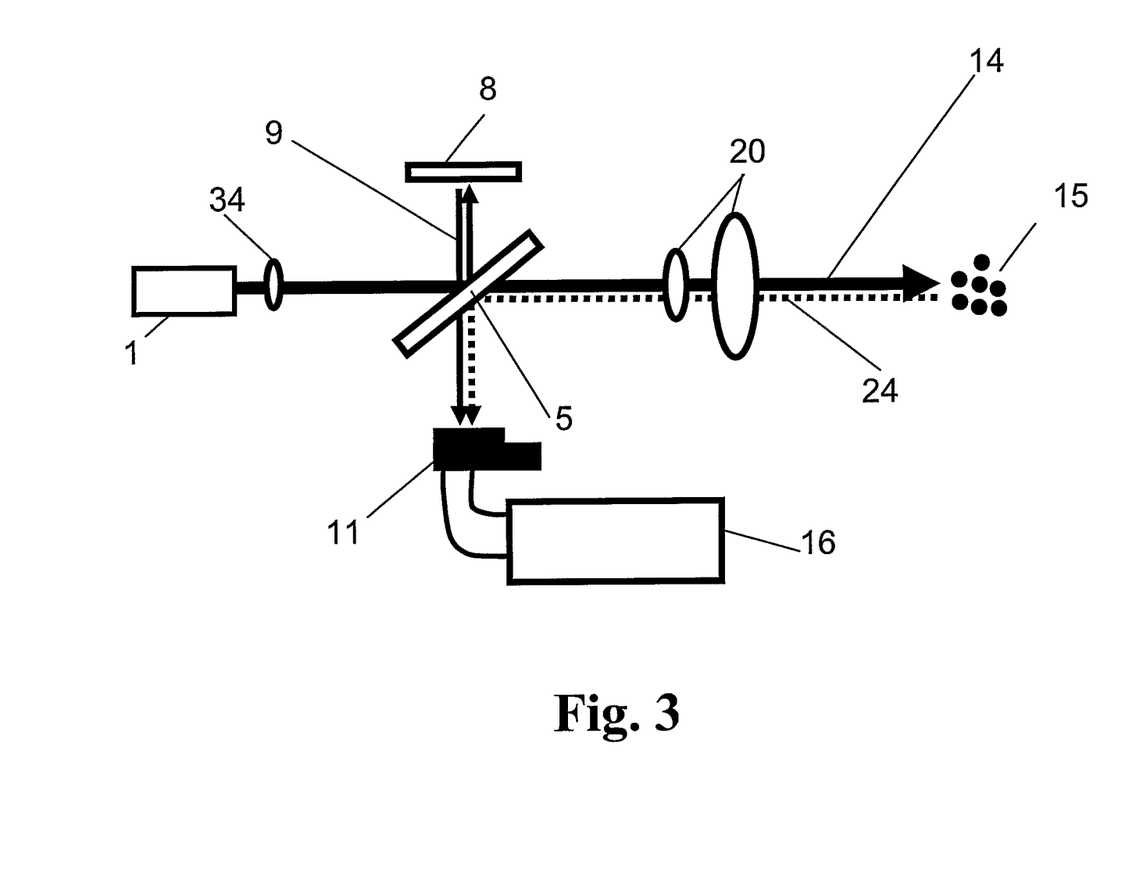
FIG. 3 schematically illustrates another embodiment of the invention.

FIG. 3 schematically illustrates an embodiment of the invention including a single mode semiconductor laser 1. The optical output of the laser 1 is collimated by the lens system 34. The resulting collimated optical output 4 is p-polarized and is partly transmitted through the beam splitter 5. The beam splitter 5 has a Brewster window that is coated to transmit p-polarized light from the semiconductor laser 1 and to reflect s-polarized light to form the reference beam 9 and thus, the beam splitter 5 also functions as the reference beam generator. A quarter-wave birefringent optical plate (not shown) is positioned after the beam splitter 5 for conversion of the transmitted p-polarized light into circular polarized light to form the measurement beam 14. The telescope 20 focuses the measurement beam 14 at the measurement volume 15 with the target in the present example constituted by particles suspended in the air. The particles back scatter circular polarized light that is received by the same telescope 20 also used in the transmitter part and transmitted back towards the quarter-wave plate that converts the circular polarized light into s-polarized light for reflection by the Brewster window towards the detector 11. Another quarter-wave plate (not shown) converts the s-polarized light reflected from the beam splitter 5 into circular polarized light, and a reflector 8 reflects the reference beam 9 back through the quarter-wave plate that converts the circular polarized light into s-polarized light for transmission through the beam splitter towards the detector 11. The detector 11 mixes the reference beam 9 with the back scattered light from the particles, and the signal processor 16 extracts the difference frequency, i.e. the Doppler frequency, and converts the difference frequency into the particle velocity component in the direction of the measurement beam that is assumed to be identical to the wind velocity component in the direction of the measurement beam.

The benefits of this system are many-fold, for example only a single semiconductor laser is necessary for generating the sufficient optical power needed to detect a Doppler signal. The combination of the polarizing beam splitter 5 and the quarter wave plates (not shown) also act as a beam combiner to direct the reference beam 9 and the received signal beam towards the detector 11.

Figure 4:
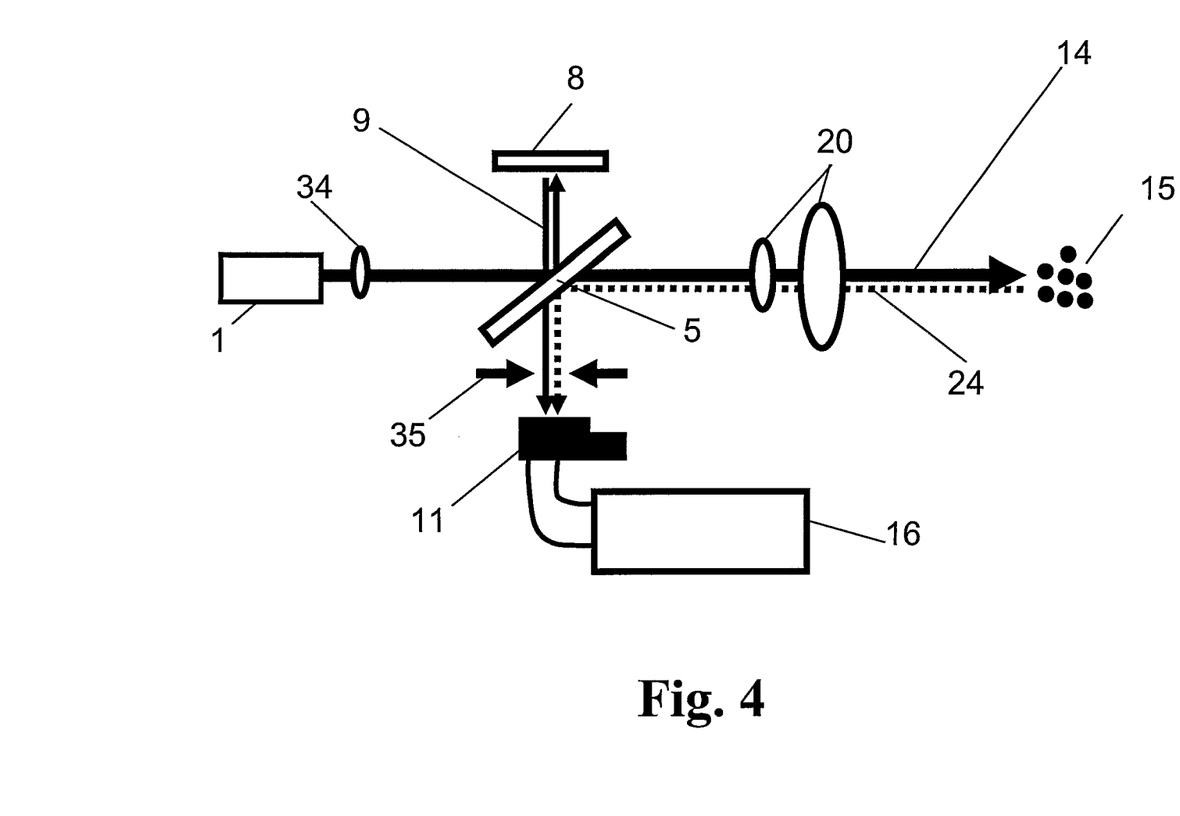
FIG. 4 schematically illustrates an embodiment of the invention including a pin-hole, FIG. 5 schematically illustrates an embodiment of the invention including a feed-back system, FIG. 6 schematically illustrates yet another embodiment of the invention, FIG. 7 schematically illustrates the embodiment of FIG. 6 with an added wedged feed-back element, FIG. 8 schematically illustrates still another embodiment of the invention.

FIG. 4 schematically illustrates another embodiment of the invention similar to the embodiment of FIG. 3 except that the embodiment of FIG. 4 also has a pinhole 35. The semiconductor laser 1 does not yield a pure Gaussian TEM00 mode in its optical output. In the homodyne mixing system utilized in the illustrated embodiment, only the Gaussian part of the beams contributes to the detection of the Doppler signal. A spatial filtering of the laser optical output is therefore useful. Normally, the spatial filtering of the laser optical output can be performed by focusing the light into an optical fibre or by using a lens and a pinhole as a spatial filter. In the illustrated embodiment, spatial filtering of the transmitted measurement beam is inherently performed by the telescope 20. In the focus region of the focusing telescope 20, the telescope will work as an optical Fourier transforming unit which only forms a focused measurement volume by the Gaussian part of the laser output. The higher spatial non-Gaussian frequencies are localized outside this centre measurement volume and do not contribute to the optical signal received by the telescope. The reference beam 9 obtained directly from the laser optical output is spatially filtered by employing a matched combination of the focal length of a focusing lens 10 (not shown) and the size of the pinhole 35. The lens 10 acts as a spatial Fourier transforming lens when the pinhole 35 is positioned at the focal plane of the lens. By selection of the area of the pinhole 35 to be equal to the size of the centre Gaussian part of the Fourier transform of the reference beam 9, only this part of the beam 9 will interfere with the signal beam and contribute to the detected Doppler signal. Higher spatial frequencies will fall outside the pinhole 35 and will not be detected and will not disturb the detection process.

Figure 5:
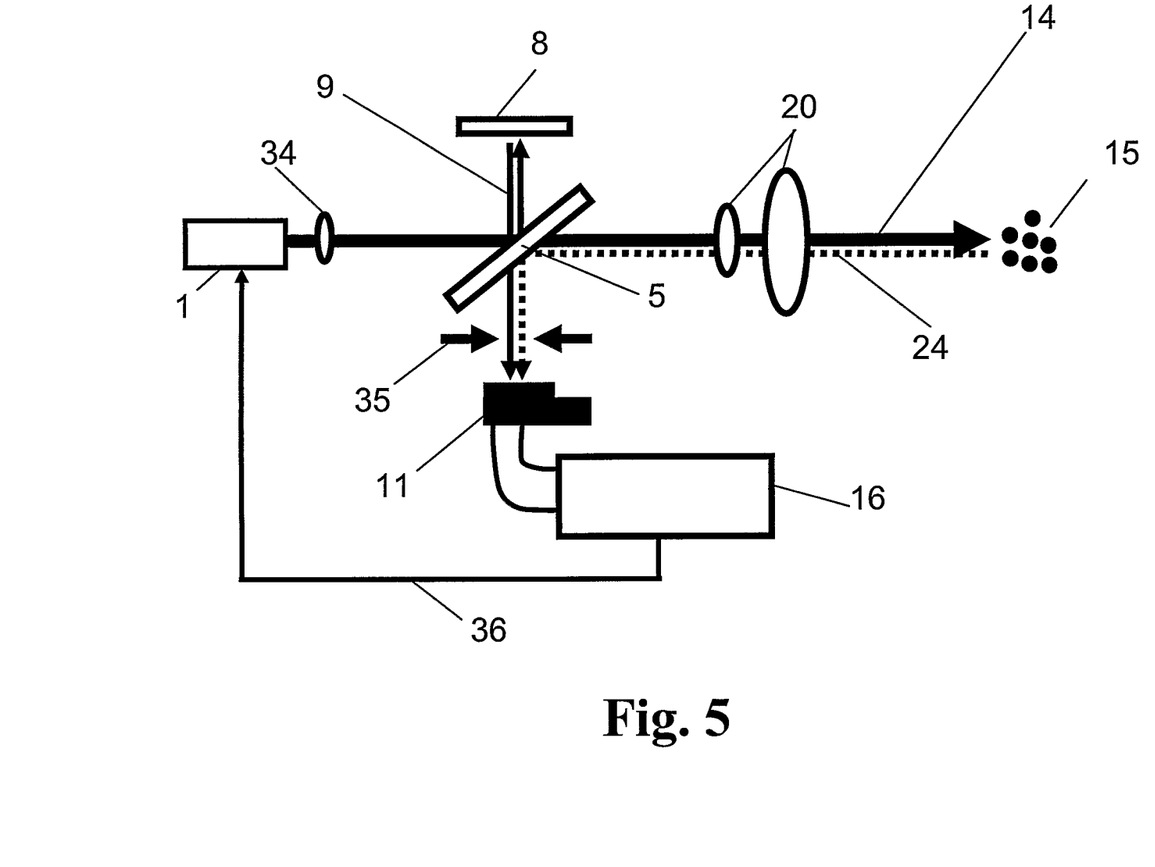

FIG. 5 schematically illustrates an embodiment of the invention similar to the embodiment of FIG. 3 or FIG. 4 except that the embodiment of FIG. 5 also has a control output 36 from the processor 16 to control the semiconductor laser assembly control parameters, such as supply current, temperature, etc., or any combination of control parameters, during operation of the LIDAR system, e.g. in response to the detector signal. For example, when the laser assembly is not operating in a single-frequency state, the coherence length will change dramatically. As a result the LIDAR Doppler signal will drop out. By tuning for example the temperature or current of the laser assembly 1, single-frequency operation can be re-established and also optimised by maximizing the measured Doppler signal. It should be noted that the coherence length of the laser assembly is very sensitive to even small changes in settings.

Figure 6:
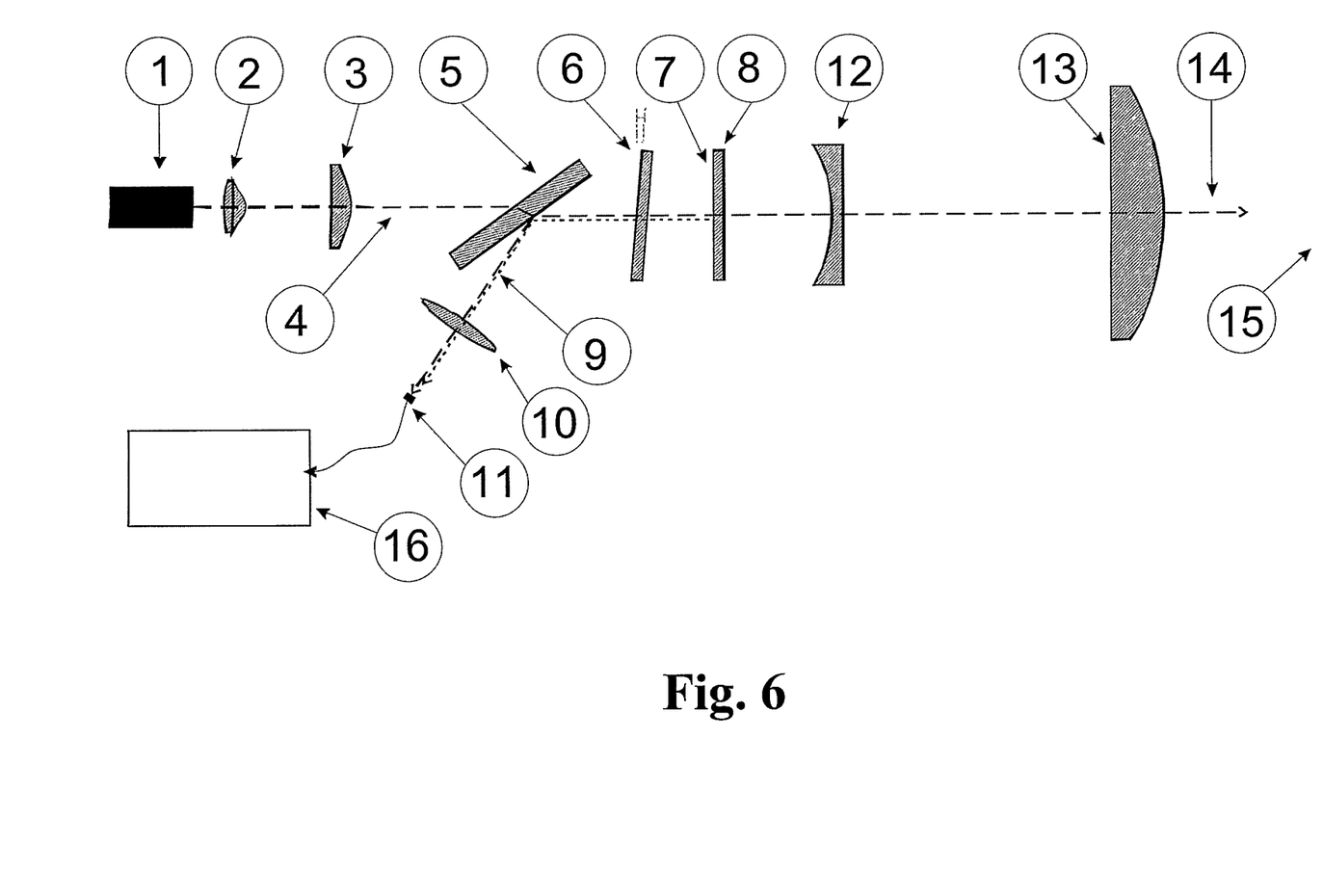

FIG. 6 schematically illustrates an embodiment of the invention including a single mode semiconductor laser 1. The optical output of the laser 1 is collimated in both directions by the lens 2 and the cylindrical lens 3. The resulting collimated optical output 4 is linearly TM-polarized and is fully transmitted through the polarizing beam splitter 5. The quarter wave plate 6 turns the transmitted optical output into a circular polarization state. The quarter wave plate 6 is slightly tilted to avoid back-reflections to reach the laser. The surface 7 of the partly reflecting reference window 8 is coated to back-reflect a certain percentage of the laser optical output. The back reflected beam is transmitted back through the quarter wave plate 6 where it becomes linearly TE-polarized. This TE-polarized beam is fully reflected by the surface of the polarizing beam splitter 5 and forms the reference beam 9. The reference beam 9 is focused by the lens 10 onto the detector 11. The main percentage of the laser optical output is transmitted as circular polarized light through the reference window 8 and is expanded and focused by the telescope lenses 12 and 13. The transmitted measurement beam 14 is focused onto the measurement volume 15 (not shown). The focus distance of the telescope sets the measurement distance for the system. Particles or aerosols in the measurement volume 15 have a velocity component directed along the propagation path of the transmitted measurement beam 14. The back-scattered and Doppler shifted signal beam from the measurement volume is received by the same telescope (the lenses 13 and 12) also used in the transmitter part and transmitted back through the reference window 8 and further through the quarter wave plate 6 which in turn changes the polarization state of the optical signal beam to become TE-polarized. The polarizing beam splitter then fully reflects the received optical signal beam to precisely align with and following the reference beam 9 through the focusing lens 10 which focus both beams onto a detector 11. The surface of the detector is slightly tilted to avoid any back reflections to propagate back in the optical path of the system. The received optical signal and the reference beam form a time evolving optical interference signal on the detector surface which, together with the detection process at the detector, forms a homodyne detection of the Doppler frequency of the received signal. The detection means converts the optical signal into an electrical Doppler signal. The electrical Doppler signal from the detector 11 is further amplified and Fourier analyzed by the signal processor 16.

The benefits of this system are many-fold: Only a single semiconductor laser is necessary for generating the sufficient optical power needed to detect a Doppler signal. The combination of the polarizing beam splitter 5 and the quarter wave plate 6 acts as beam director to direct all the optical power from the reference beam 9 and the received signal beam towards the detector 11. Also, the same combination of the polarizing beam splitter 5 and the quarter wave plate 6 acts as an optical isolator which prevents any returning optical power to propagate towards the laser 1. The semiconductor laser 1 does not yield a pure Gaussian TEM00 mode in its optical output. In the homodyne mixing system presented here, only the Gaussian part of the beams will contribute the detection of the Doppler signal. A spatial filtering of the laser optical output is therefore needed. Normally, the spatial filtering of the laser optical output can be performed by focusing the light into an optical fibre or by using a lens and a pinhole as a spatial filter. However, the spatial filtering of the laser optical output is inherently built into the design in the following manner: When looking at the transmitted measurement beam in the focus region of the focusing telescope (the lenses 12 and 13), the telescope will work as a optical Fourier transforming unit which only forms a focused measurement volume by the Gaussian part of the laser output. The higher spatial non-Gaussian frequencies are localized outside this centre measurement volume and will afterwards not contribute to the optical signal received by the telescope. The reference beam 9 obtained directly from the laser optical output is spatially filtered by employing a matched combination of the focal length of the focusing lens 10 and the size of the detector area 11. The lens 10 acts as a spatial Fourier transforming lens when the detector area 11 is positioned at the focal plane of the lens. By selection of the area of the detector to be equal to the size of the centre Gaussian part of the Fourier transform of the reference beam, only this part of the beam will interfere with the signal beam and contribute to the detected Doppler signal. Higher spatial frequencies will fall outside the detector area and will not be detected and will not disturb the detection process.

Figure 7:
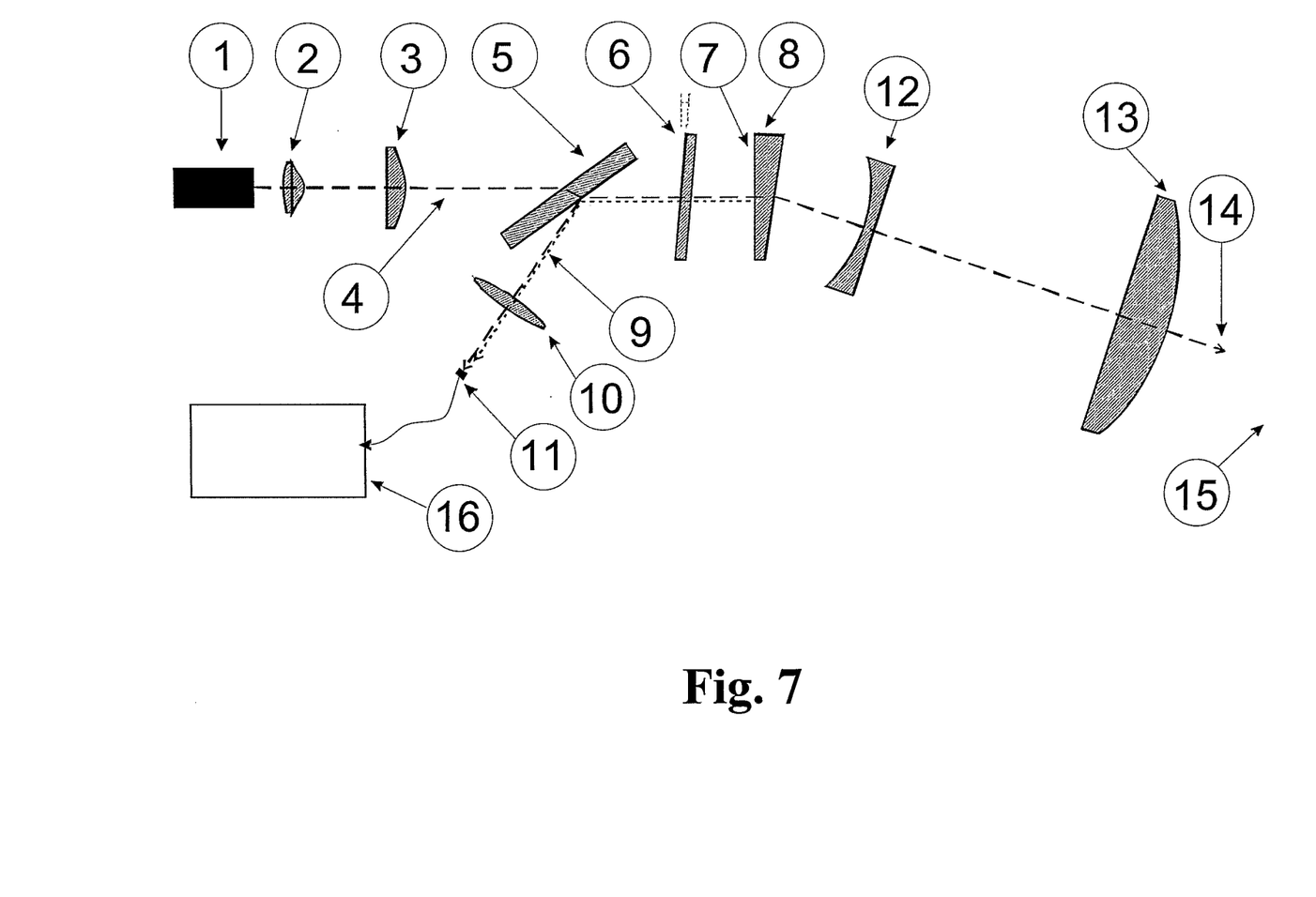

FIG. 7 schematically illustrates another embodiment of the LIDAR system according to the present invention. The principle is the same as for FIG. 6 with the exception that the reference beam is provided by replacement of the reference window with a wedge 8 where the first surface 7 of the wedge is coated to back-reflect a certain percentage of the laser optical output to form the reference beam 9. The benefit of this system is the avoidance of having back-reflections from the second surface of the reference window. The actual power of the optical reference beam can thereby be accurately controlled.

Figure 8:
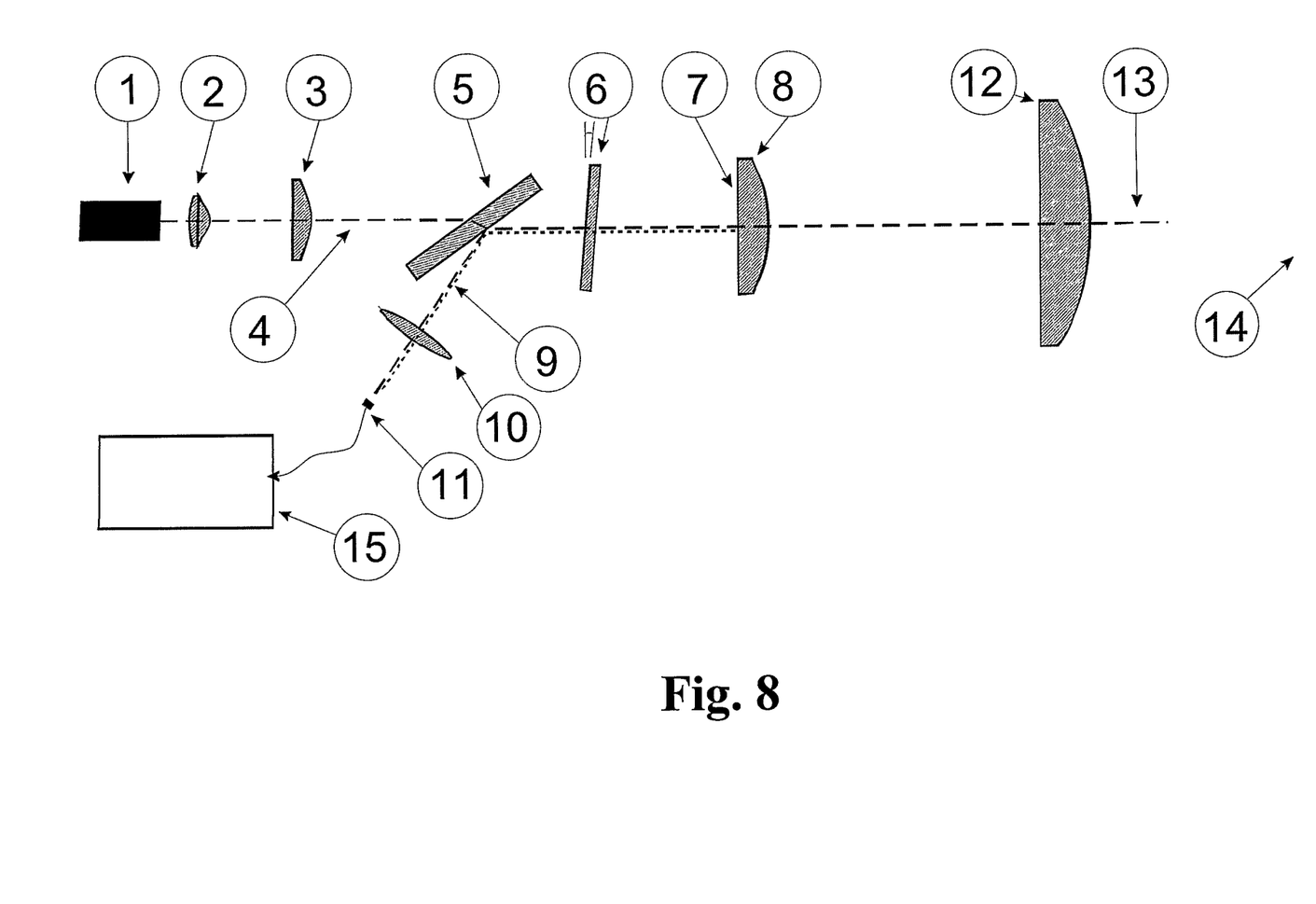

FIG. 8 schematically illustrates yet another embodiment of the LIDAR system according to the present invention. The principle is the same as for FIG. 6 except for the fact that the reference beam is provided by a flat surface 7 on the first lens in the telescope that is coated to back-reflect a certain percentage of the laser optical output to form the reference beam 9. The benefit of this system is simplification due to a smaller number of optical components. However the drawback of this system is that, unless the large lens of the telescope 12 can be moved, the telescope will be fixed to a pre-aligned measurement distance.

Figure 9:
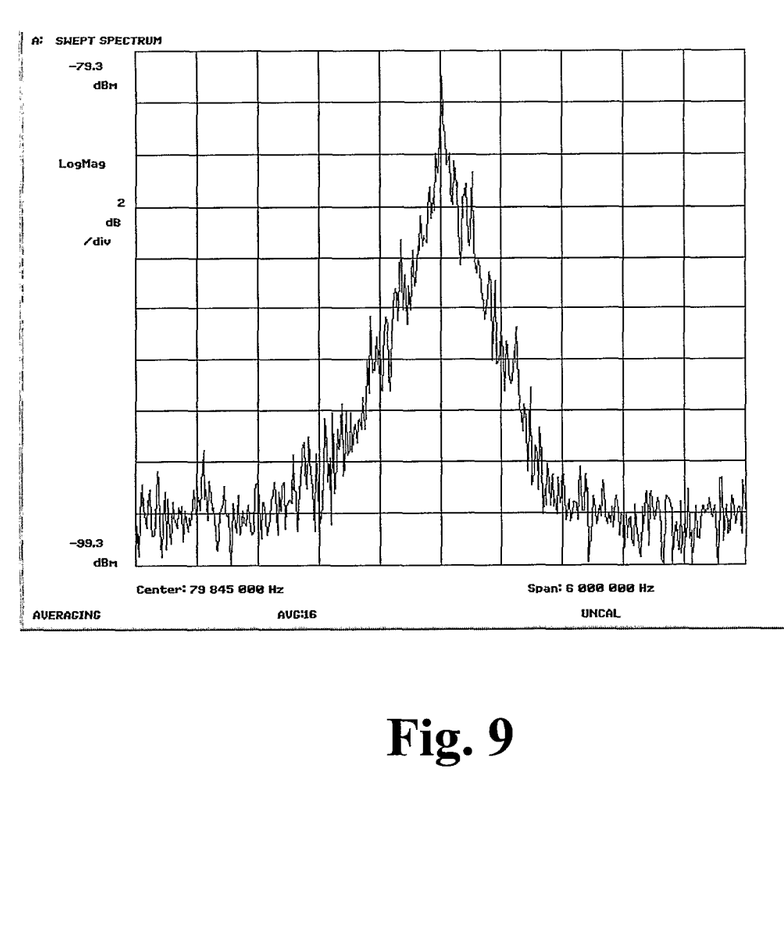
FIG. 9 is a plot of the power spectrum of a semiconductor MOPA.

FIG. 9 is a plot of the power spectrum of a semiconductor MOPA used in an embodiment of the present invention. It has a 100 kHz FWHM corresponding to a coherence length of app. 900 metrics.

Figure 10:
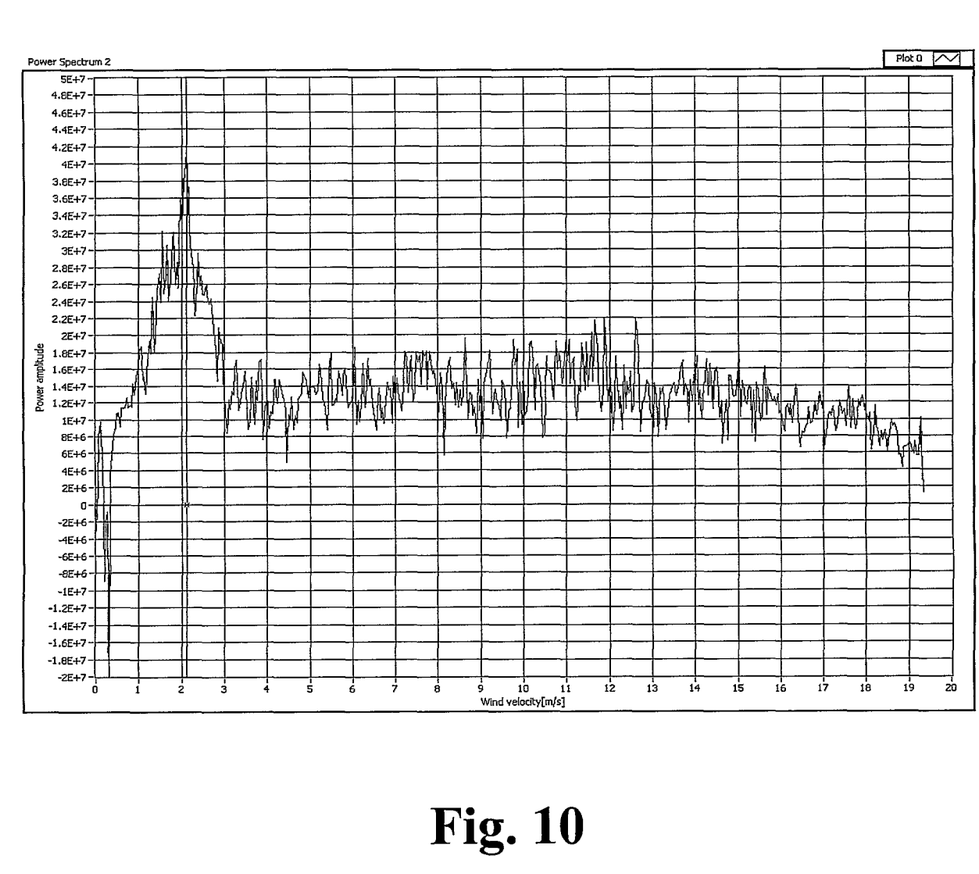
FIG. 10 is a plot of the Doppler frequency spectrum measured with the embodiment of FIG. 6.

FIG. 10 is a plot of the Doppler frequency spectrum measured with the embodiment of FIG. 6. Doppler frequency is converted to wind speed that is plotted along the x-axis and signal power is plotted along the y-axis. The measurement beam was focused at a distance of 40 metrics on a day with low wind speed.

Each of the disclosed embodiments may be modified to include a first optical fibre for transmission of the measurement beam from the light source to the telescope, and a second optical fibre for transmission of light emitted from the target in the measurement volume to the detector whereby location of the telescope may be physically remote from the light source and detector and other components of the LIDAR system. The first and second optical fibre may be combined in one optical fibre. Further, the illustrated optical components may be substituted by corresponding fibre optical components. For example, the beam splitters 5 in FIGS. 3-8 may be substituted by an optical fibre coupler.

The invention claimed is:

1. A monostatic coherent LIDAR system comprising:
an integrated semiconductor laser assembly configured for emission of a measurement beam of electromagnetic radiation directed towards a measurement volume of air for illumination of suspended particles in the measurement volume of air,
a reference beam generator for generation of a reference beam,
a detector for generation of a detector signal by mixing of the reference beam with light emitted from the suspended particles in the measurement volume illuminated by the measurement beam of air, and
a signal processor for generating a velocity signal corresponding to the velocity of the air suspended particles based on the detector signal,
wherein the integrated semiconductor laser assembly is a master oscillator power amplifier (MOPA) having a semiconductor laser and a tapered semiconductor amplifier integrated on the same substrate, or the integrated semiconductor laser assembly is a tapered semiconductor laser.

2. A monostatic coherent LIDAR system according to claim 1, wherein the signal processor is further configured for determination of wind velocity.

3. A monostatic coherent LIDAR system according to claim 1, wherein the signal processor is further configured for determination of turbulence in the measurement volume.

4. A monostatic coherent LIDAR system according to claim 1, wherein the signal processor is further configured for determination of temperature in the measurement volume.

5. A monostatic coherent LIDAR system according to claim 1, wherein the signal processor is configured for generating a concentration signal corresponding to the concentration of the particles in the measurement volume based on the detector signal.

6. A monostatic coherent LIDAR system according to claim 1, wherein the signal processor is configured for determination of particle concentration in the measurement volume.

7. A monostatic coherent LIDAR system according to claim 1, further comprising an optical fiber for transmission of the measurement beam between the integrated semiconductor laser assembly and an optical output of the LIDAR system.

8. A monostatic coherent LIDAR system according to claim 1, wherein the integrated semiconductor laser assembly comprises a semiconductor laser and a semiconductor tapered power amplifier for amplification of the beam emitted by the semiconductor laser.

9. A monostatic coherent LIDAR system according to claim 8, wherein the semiconductor laser is of the semiconductor MOPA type.

10. A monostatic coherent LIDAR system according to claim 9, wherein the semiconductor MOPA type laser comprises a semiconductor chip with a distributed feedback master oscillator and a semiconductor tapered power amplifier.

11. A monostatic coherent LIDAR system according to claim 1, wherein the reference beam generator is a beam splitter for dividing the beam emitted by the integrated semiconductor laser assembly into the reference beam and the measurement beam directed towards the measurement volume.

12. A monostatic coherent LIDAR system according to claim 1, wherein the reference beam generator is the integrated semiconductor laser assembly that is configured to emit the reference beam and the measurement beam.

13. A monostatic coherent LIDAR system according to claim 1, further comprising a spatial filter for filtering the reference beam thereby reducing the non-Gaussian spatial components of the reference beam.

14. A monostatic coherent LIDAR system according to claim 13, further comprising a Fourier lens positioned in the propagation path of the reference beam, and wherein the spatial filter is positioned in the Fourier plane of the Fourier lens for reduction of the non-Gaussian spatial components of the reference beam.

15. A monostatic coherent LIDAR system according to claim 13, wherein the spatial filter comprises an aperture, the size of which is matched to the size of the detector.

16. A monostatic coherent LIDAR system according to claim 1, further comprising a beam combiner for combining the reference beam with light emitted from the target.

17. A monostatic coherent LIDAR system according to claim 16, wherein
the measurement beam is p-polarized, and
the beam splitter and the beam combiner is one unit comprising
a Brewster window that is coated to transmit p-polarized light from the integrated semiconductor laser assembly and to reflect s-polarized light,
a quarter-wave birefringent optical plate for conversion of the p-polarized light into circular polarized light to form the measurement beam and conversion of circular polarized from the particles into s-polarized light for reflection by the Brewster window, and wherein
the beam splitter comprises a reflector for reflection of a part of the measurement beam to form the reference beam and for direction of the reference beam back through the quarter-wave plate for reflection towards the detector.

18. A monostatic coherent LIDAR system according to claim 1, wherein the integrated semiconductor laser assembly is operated in response to a signal from the detector for optimization of the laser output of the integrated semiconductor laser assembly.

19. A monostatic coherent LIDAR system according to claim 1, comprising a beam cleanup device with a single mode fiber forming the measurement beam.

20. A monostatic coherent LIDAR system according to claim 19, wherein the beam cleanup device comprises a focusing lens, a pinhole, and a collimating lens.

21. A monostatic coherent LIDAR system according to claim 1, comprising a frequency shifting element for frequency shifting the measurement beam or the reference beam.

22. A wind turbine comprising a monostatic coherent LIDAR system according to claim 1.

23. A sailing-boat comprising a monostatic coherent LIDAR system according to claim 1.

24. A method for particle velocity determination based on light scattered by particles, comprising the steps of:
emitting a measurement beam of electromagnetic radiation and transmitting the measurement beam through imaging optics towards a measurement volume of air for illumination of suspended particles in the measurement volume of air,
generating a reference beam,
mixing the reference beam with backscattered light emitted from the suspended particles in the measurement volume of air illuminated by the measurement beam for generation of a velocity signal corresponding to the velocity of the suspended particles, the backscattered light received through the same imaging optics transmitting the measurement beam,
wherein the step of emitting a measurement beam comprises provision of an integrated semiconductor laser assembly comprising a tapered semiconductor laser or a semiconductor laser and a tapered semiconductor amplifier integrated on the same substrate for the emission of the measurement beam.

25. A method according to claim 24, wherein the step of generating a reference beam, comprises the step of dividing the beam emitted by the integrated semiconductor laser assembly into the reference beam and the measurement beam directed towards the measurement volume.

26. A method according to claim 24, wherein the step of generating a reference beam comprises the step of providing the integrated semiconductor laser assembly configured to emit the reference beam and the measurement beam.

27. A method according to claim 24, further comprising the step of mixing the reference beam with light emitted from the particles in the measurement volume illuminated by the measurement beam for generation of a temperature signal corresponding to the temperature in the measurement volume.

28. A method according to claim 24, further comprising the step of mixing the reference beam with light emitted from the particles in the measurement volume illuminated by the measurement beam for generation of a concentration signal corresponding to the concentration of the particles in the measurement volume.

29. A method according to claim 24, further comprising the step of spatially filtering the reference beam thereby reducing the non-Gaussian spatial components of the reference beam.

30. A method according to claim 24, further comprising the step of performing beam cleanup by provision of a single mode fiber forming the measurement beam.

31. A method according to claim 24, further comprising the step of adjusting pitch of the blades of a wind turbine in response to the determined velocity signal.

32. A method according to claim 24, further comprising the step of trimming a sailing-boat in response to the determined velocity signal.

33. A monostatic coherent LIDAR system according to claim 1, wherein the measurement beam operates at eye-safe wavelengths such as 1.5 mu·m.

34. A monostatic coherent LIDAR system according to claim 1, wherein the measurement beam is of continuous wave type.

35. A monostatic coherent LIDAR system according to claim 1, wherein the power of the measurement beam is in the order of hundreds of milliwatts or orders of Watts.

36. A method according to claim 24, wherein the step of emitting a measurement beam comprises emitting a continuous wave type measurement beam.

* * * * *